United States Patent [19]

Clapp

[11] 4,113,006
[45] Sep. 12, 1978

[54] TWO-PIECE TUBE PLUG FOR REPAIRING TUBES IN HEAT EXCHANGERS AND THE LIKE

[76] Inventor: Porter B. Clapp, 8 Robin Hood La., New City, N.Y. 10956

[21] Appl. No.: 764,520

[22] Filed: Jan. 31, 1977

[51] Int. Cl.² .................. F28F 11/02; F16L 55/10
[52] U.S. Cl. ............................ 165/76; 138/89; 138/97; 29/523
[58] Field of Search .............. 165/137, 76; 138/89, 138/97; 29/523

[56] References Cited

U.S. PATENT DOCUMENTS

| 2,856,963 | 10/1958 | Hoerter | 220/237 |
| 3,203,479 | 8/1965 | Hindman | 165/134 |
| 3,358,869 | 12/1967 | Palmer et al. | 138/89 |
| 3,457,987 | 7/1969 | Lampe | 165/76 |
| 3,525,365 | 8/1970 | Meulendyk | 138/89 |
| 3,964,339 | 6/1976 | Antonio et al. | 138/89 |

FOREIGN PATENT DOCUMENTS 1,079,316  8/1967  United Kingdom .................. 138/89

Primary Examiner—Charles J. Myhre
Assistant Examiner—Sheldon Richter
Attorney, Agent, or Firm—Robert E. Burns; Emmanuel J. Lobato; Bruce L. Adams

[57] ABSTRACT

A two-piece tube plug for repairing damaged tubes, of condensers, heat exchangers etc., in situ. The plug is made of a thimble having a shell with one end closed and an opposite open end. The thimble has a tapered axial bore in which a tapered cylindrical plug is inserted for expanding the shell of the thimble outwardly radially with the thimble in position on an end of a damaged tube at the tube sheet. The cylindrical plug deforms the shell outwardly radially when driven into the thimble shell to effect a closure on the tube and effect a fluid-tight seal between the thimble and the tube.

1 Claim, 3 Drawing Figures

TWO-PIECE TUBE PLUG FOR REPAIRING TUBES IN HEAT EXCHANGERS AND THE LIKE

BACKGROUND OF THE INVENTION

This invention relates generally to repair of tubes in condensers and other heat exchangers and the like and more particularly to a two-piece tube plug for repairing damaged tubes in situ without damage to the tube sheet.

Condensers and heat exchangers are provided with a shell within which are disposed tube sheets on which are anchored tubes extending axially internally of the shell between the tube sheets. These tubes at times fail and may develop a rupture that may result in undesired contamination by a cooling fluid of the fluid being cooled or vice versa.

When these tube failures occur the damaged or ruptured tube is sealed off at both ends at the tube sheet. The seal is accomplished by the use of known tube repair plugs. Known two-piece tube repair plugs are provided as a ring with open opposite ends and having a tapered axial bore into which is inserted a tapered cylindrical plug that expands the ring outwardly radially for closing the open end of the damaged tube and developing a seal between the ring and the tube. A seal is established between the plug and the ring.

The known two-piece tube repair plugs will develop leakage of the plug after extended use and must be removed and replaced. Furthermore, this type of known tube repair plug will deform the tube sheet.

SUMMARY OF THE INVENTION

It is a principal object of the present invention to provide a two-piece tube repair plug for repairing damaged tubes in condensers and heat exchangers and the like that will maintain a fluid tight-seal positively on a damaged tube and will avoid damage to the tube sheet during its installation.

The two-piece tube repair plug according to the invention is made as a thimble having a shell which is insertable in use into an open end of a damaged tube at an end portion thereof mounted on a tube sheet. The thimble has an open end and an opposite closed end which is closed by an end wall or partition. A plug constructed as a tapered cylinder having a lesser taper than the tapered axial bore of the thimble is inserted in use into the open end of the thimble for deforming it outwardly radially to effect a seal between the shell of the thimble and the end portion of the tube within which the thimble is mounted.

The tapered cylindrical plug is dimensioned to be received in the thimble and gradually deform the thimble outwardly radially as it is inserted progressively axially into the axial bore of the thimble. The cylindrical plug is provided with an axial recess on the periphery thereof extending along the full axial length of the plug to allow escape of air from internally of the thimble as the plug is inserted axially therein. The open end of the thimble has a radial or outwardly extending flange provided with circumferentially spaced peripheral notches to allow the shell to deform outwardly radially.

BRIEF DESCRIPTION OF THE DRAWINGS

Other features and advantages of the two-piece tube repair plug in accordance with the invention will be understood in conjunction with the following specification, claims and appended drawing in which:

DESCRIPTION OF THE PREFERRED EMBODIMENT

Figure 1:
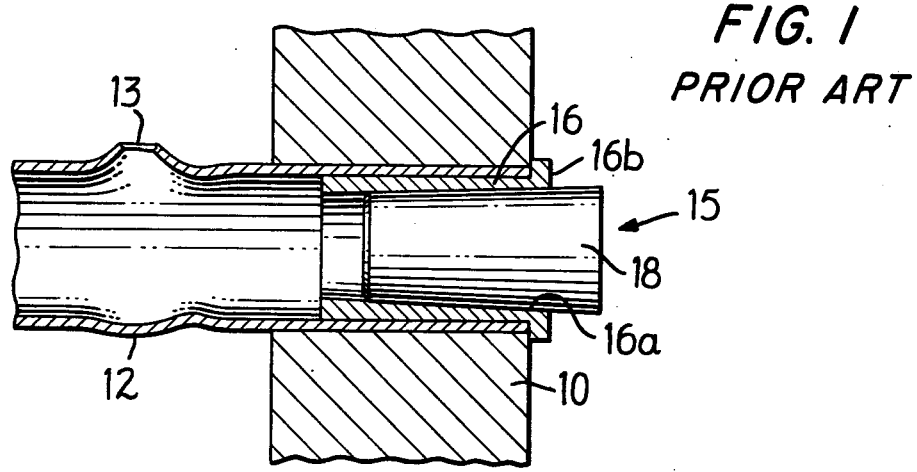
FIG. 1 is a fragmentary section view of a ruptured tube secured to a tube sheet and having a known two-piece tube repair plug therein.

The drawings illustrate fragmentarily, in FIG. 1, a tube sheet 10 mounted within the shell, not shown, of a condenser or heat exchanger or the like. A similar tube sheet, not shown, is mounted spaced from the tube sheet 10 and a plurality of tubes, for example a tube 12, extend between the tube sheets for allowing flow of a fluid medium through the tubes and a different fluid medium to flow around the tubes internally of the condenser or heat exchanger shell, not shown. Heat exchange is accomplished between the fluid mediums.

The tube 12 illustrated in FIG. 1 is assumed to be a tube that has been damaged or ruptured. A rupture 13 will allow contamination. In order to repair the tube a two-piece tube repair plug 15 is inserted at the open end of the tube at the tube sheet 10 for sealing the tube in known manner.

The known two-piece tube repair plug comprises a ring 16 having open ends at opposite ends thereof and a tapered axial bore 16a converging in a direction toward the interior of the tube as illustrated. The ring is provided with an outer flange 16b at an end thereof to provide a shoulder to limit the axial travel of the ring 16 into the tube 12 when inserted therein for repairing the tube.

The tapered cylindrical plug 18 is inserted into the ring 16 to seal-off the ruptured tube. The taper on the cylindrical plug is chosen to expand or deform the ring 16 radially outwardly to effect a seal between the inner cylindrical plug and the outer ring and a seal between the ring and the tube. The known two-piece tube repair plug 15 eventually develops leakage between the inner cylindrical plug and the outer ring. Since both ends of the ring are open fluid will enter the ruptured tube 12 as the leakage develops and increases so that the seal on the ruptured tube 12 is rendered ineffective.

Figure 2:
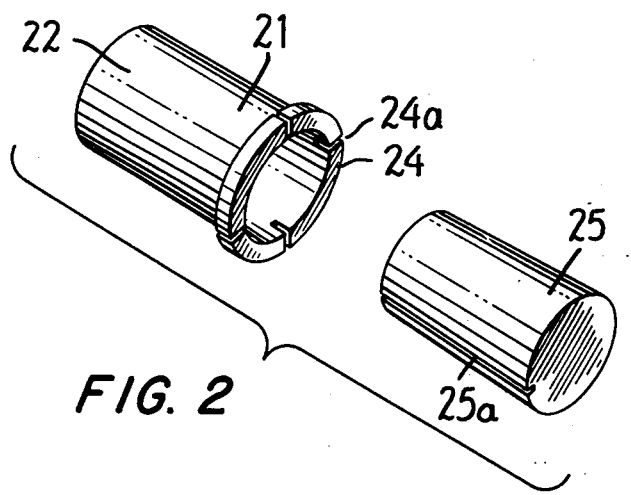
FIG. 2 is an exploded view of a two-piece tube repair plug in accordance with the invention.
Figure 3:
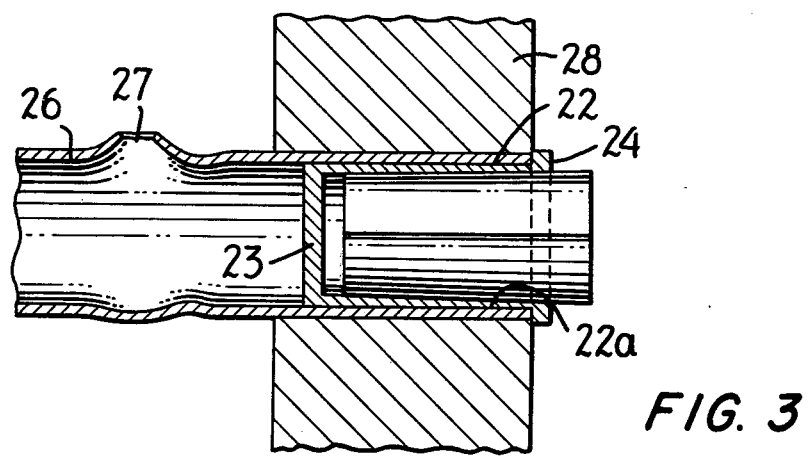
FIG. 3 is a fragmentary sectional view similar to FIG. 1 illustrating a two-piece tube repair plug is accordance with the invention in use.

A two-piece tube repair plug according to the invention is illustrated in FIG. 2. The tube repair plug comprises thimble 21 having an outer shell 22 closed at one end by a partition or wall 23 integral with the shell 22. The shell has a tapered axial bore 22a converging toward an end wall or partition 23 and thus toward a closed end of the shell. At the opposite open end the shell is provided with a flange 23 extending circumferentially and radially outwardly of the shell. The flange is provided with a plurality of circumferentially spaced peripheral notches 24a that function as hereinafter explained. A tapered cylindrical plug 25 is inserted in use into the thimble as illustrated in FIG. 3 for expanding the shell 22 outwardly radially to effect a seal between it and the inner surfaces of an end portion of a tube 26 having a rupture 27 and secured to a tube sheet 28 in known manner.

In order to allow entry of the tapered cylindrical plug 25 into the axial bore of the shell of the thimbel the tapered cylindrical plug is provided with an axial recess 25a on the periphery thereof and extending the full axial length of the plug. The recess is sufficiently deep to allow air from internally of the bore of the shell to flow outwardly therethrough as the plug is inserted axially into the thimble to effect the deformation thereof for effecting a seal-off of the tube.

The plug elements 21, 25 may be constructed of a suitable metal for example brass. The following table sets forth a plug and thimble dimensions for one particular size tube:

THIMBLE DIMENSIONS 0.944 inch — O.D. of the shell
⅛ inch — thickness of end wall
1½ inch — overall axial length
0.835 inch — axial bore I.D. at center
0.870 inch — axial bore I.D. at open end
1⅛ inch — O.D. of flange
1/32 inch — shoulder formed by flange
1/32 inch — each slot-equally spaced circumferentially

PLUG DIMENSIONS 0.850 inch — O.D. at smaller end
⅞ inch — O.D. at larger end
0.010 inch — width of air groove
0.025 inch — depth of air groove

MISCELLANEOUS

⅛ inch — air space between end wall and plug in assembled condition
0.870 × 1° — taper
1° taper = 0.017 per inch Those skilled in the art will recognize that a positive seal will be maintained on the ruptured tube by the two-piece tube repair plug in accordance with the invention since if the seal between inner plug and the outer shell is lost the end partition will maintain a positive seal. Since the tube sheet is not damaged during the installation of the two-piece tube repair plug the lasting positive seal is maintained between the outer shell and the known surfaces of the tube and between the tube and the tube sheet.

What I claim is:

1. A two-piece tube repair plug for use in repairing damaged tubes in condensers, heat exchangers and the like comprising; a tubular thimble insertable in use into an open end of a damaged tube, mounted on a tube sheet, for isolating the tube sheet at the tube sheet; said thimble having a closed end and an opposite open end and insertable into said tube with said open end thereof disposed toward the open end of said tube; said thimble comprising a material deformable outwardly radially for engaging the interior of an end portion of said tube positively and closing it with a fluid-tight seal and comprising a tubular shell having a flange circumferentially of said open end thereof to limit the extent of axial entry into the open end of said tube a cylindrical plug insertable axially into said thimble through said open end thereof for deforming said thimble outwardly radially to effect said seal; and said plug being dimensioned to be received in said thimble and configured to deform said thimble outwardly radially; said thimble comprising a tapered bore converging in a direction toward said closed end thereof; said plug comprising a tapered cylinder converging toward one end thereof, the taper of said cylinder being different and lesser than the taper of said tapered bore, said plug being inserted in use with said one end thereof disposed for assembly with said thimble adjacent said closed end of said thimble; said plug comprising an axial recess on the periphery thereof along the full axial length of the plug to allow escape of air from internally of said thimble as said plug is inserted axially therein; and said flange having circumferentially spaced peripheral notches to allow said shell to deform outwardly radially.

* * * * *